United States Patent [19]

Murphy et al.

[11] Patent Number: 4,492,732
[45] Date of Patent: Jan. 8, 1985

[54] MATERIALS SUITABLE FOR THERMOSETTING

[75] Inventors: Davis J. Murphy, Church Crookham; Leslie N. Phillips, Farnborough, both of England

[73] Assignee: The Secretary of State for Defence in Her Britannic Majesty's Government of the United Kingdom of Great Britain and Northern Ireland, England

[21] Appl. No.: 495,699

[22] Filed: May 18, 1983

Related U.S. Application Data

[60] Division of Ser. No. 417,516, Sep. 13, 1982, Pat. No. 4,405,543, which is a continuation of Ser. No. 139,733, Apr. 11, 1980, abandoned.

[30] Foreign Application Priority Data

Apr. 20, 1979 [GB] United Kingdom ................ 7913896

[51] Int. Cl.³ .............................................. B32B 5/16
[52] U.S. Cl. .................................. 428/404; 428/406; 428/407; 521/54; 523/218; 523/219
[58] Field of Search ..................... 428/404, 406, 407; 821/54; 523/218, 219

[56] References Cited

U.S. PATENT DOCUMENTS

| | | | |
|---|---|---|---|
| 2,806,509 | 9/1957 | Bozzacco et al. | 521/54 |
| 2,978,340 | 4/1961 | Veatch et al. | 521/54 |
| 3,030,184 | 1/1966 | Alford | 521/54 |
| 3,030,215 | 4/1962 | Veatch et al. | 521/54 |
| 3,142,675 | 2/1972 | McKenzie | 521/54 |
| 3,166,615 | 1/1965 | Farrell | 264/123 |
| 3,296,153 | 1/1967 | Snogren | 521/54 |
| 3,325,341 | 6/1967 | Shannon | 521/54 |
| 3,786,004 | 1/1974 | Furuya et al. | 521/122 |
| 4,005,033 | 1/1977 | Georgears et al. | 260/42.51 |
| 4,040,165 | 8/1977 | Miessler et al. | 264/109 |
| 4,115,500 | 9/1978 | Voegeli | 264/126 |
| 4,352,856 | 10/1982 | Smillie | 264/123 |

FOREIGN PATENT DOCUMENTS

| | | |
|---|---|---|
| 846881 | 7/1970 | Canada . |
| 2735788 | 8/1977 | Fed. Rep. of Germany . |
| 599269 | 6/1925 | France . |
| 2346403 | 10/1975 | France . |

*Primary Examiner*—Morton Foelak
*Attorney, Agent, or Firm*—Cushman, Darby & Cushman

[57] ABSTRACT

A material suitable for thermosetting includes a collection of hollow particles adhesively mixed with a thermosetting resin in such proportions that the mixture exists in a granular form and may be converted by thermosetting into a fused solid mass having a density not greater than 0.5 grams per cubic centimeter.

The particles may be glass microbubbles or phenolic microballoons and the resin may be a hardenable Friedel-Crafts resin. The material according to the invention is more suitable for packing into shaped cavities than known resins including those containing filler particles.

5 Claims, 9 Drawing Figures

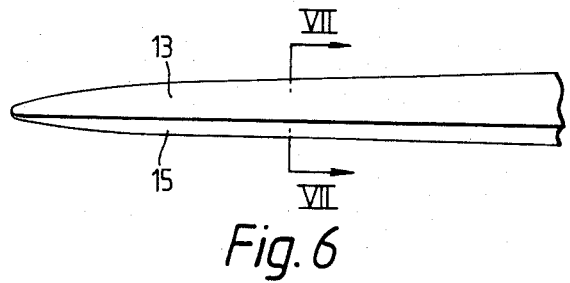
Fig. 6
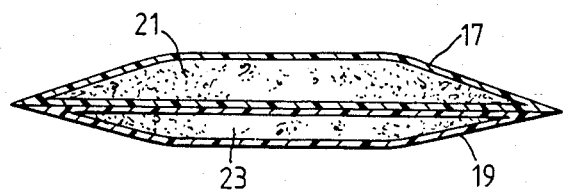
Fig. 7
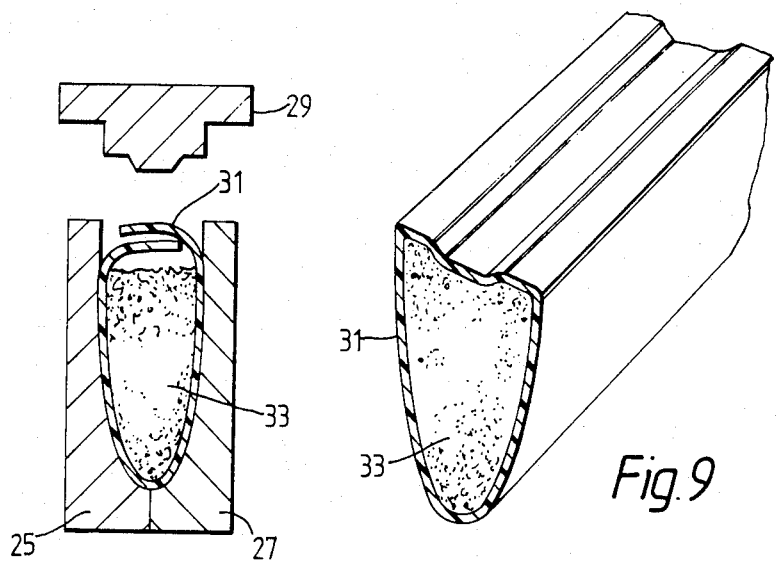
Fig. 8
Fig. 9

MATERIALS SUITABLE FOR THERMOSETTING

This is a division of application Ser. No. 417,516 filed Sept. 13, 1982, now U.S. Pat. No. 4,405,543, which in turn is a continuation of application Ser. No. 139,733 filed Apr. 11, 1980, now abandoned.

The present invention relates to materials suitable for thermosetting.

In the adhesives and plastics arts a variety of organic resins are known which may be cured or set to form a solid rigid plastics mass. The curing may be brought about primarily by chemical cross-linking often with an added chemical hardening agent with or without the action of heat. If heat is required the curing of the resin is referred to as thermosetting. The mass, when formed, may for example serve as a solid adhesive bond between two surfaces or as part or all of a structural member. The mass may incorporate such additives as filler particles or strengthening fibres bound within its body, these being added to the resin before setting.

Uncured resins are usually in the form of a liquid, usually viscous, or a paste and may be inconvenient for use in certain applications in such forms, for example, where it is necessary to pack resin into a specially shaped cavity to fill the cavity.

The purpose of the present invention, in one aspect, is to provide a resin material which is more suited than known resin materials to the filling of shaped cavities.

According to the present invention there is provided a material suitable for thermosetting including a collection of hollow particles adhesively mixed with a curable thermosetting resin in such proportions that the mixture exists in a granular form and may be converted by thermosetting into a fused solid mass having a density not greater than 0.5 grams per cubic centimeter.

In such form each grain or granule will comprise one or more of the said hollow particles coated with the resin.

By having a higher than usual proportion of hollow particles in the mixture with the curable resin this mixture is in a form more suitable to the filling of shaped cavities because of its granular or 'sandy' nature. In addition the product, ie the fused solid mass, which is obtained by curing the mixture is a lightweight material because of the significant reduction in apparent density provided by the hollow particles in the higher proportion in which they are added.

Although the mixture is more convenient for packing into cavities its use is not limited to that in cavities. The lightweight product made by curing the mixture may be used in any known application for lightweight materials, eg lightweight parts of aircraft or of floating craft, eg boats or canoes.

'Curable' indicates that the resin may be in an uncured or partly cured (sometimes referred to as a 'precured') form, preferably the latter.

'Apparent' indicates that the fused solid mass is porous, ie in the places where the hollow particles are present, and that the density concerned is that of this mass including the pores. This distinguishes from the case of an all-solid (ie non-porous fused mass) made from the material of the particles and the same resin.

Preferably, the grains of the mixture have an average diameter less than 3.5 mm suitably about 2 mm or less. The hollow particles are preferably spherical or roughly spherical particles, preferably having an average diameter in the inclusive range 20 $\mu$m, to 150 $\mu$m, eg typically 50 $\mu$m, although the diameters may vary considerably within this range. Preferably these particles are hollow glass bubbles eg so called microbubbles or alternatively fly ash armospheres although they may be hollow spheres of a cured phenolic resin, eg phenolic microballoons.

Preferably, the thermosetting resin mixed with the hollow particles is a Friedel-Crafts resin which, when added to the hollow particles, is preferably added together with a suitable known hardener and a solvent for the resin.

The relative proportions of the resin and the hollow particles depend on the actual resin and particles used but may be determined as follows.

If the apparent density of the product (ie the porous fused mass containing the resin and the hollow particles) is D, the fraction by weight of the hollow particles in the product is $f_p$, the apparent density of the hollow particles is $d_p$, the fraction by weight of the resin in the product is $f_r$ and the density of the resin in the product is $d_r$, then D is given by:

$$1/D = f_r/d_r + f_p/d_p \qquad \text{Equation 1}$$

the respective total volumes occupied by the particles and the resin in the product being additive.

However $f_p + f_r = 1$ or $f_p = 1 - f_r$ \qquad Equation 2

$$\text{Therefore } \frac{1}{D} = \frac{f_r}{d_r} + \frac{(1 - f_r)}{d_p}$$

$$= \frac{f_r d_p + d_r - f_r d_r}{d_r d_p}$$

$$= \frac{f_r(d_p - d_r) + d_r}{d_r d_p}$$

$$= \frac{-f_r(d_r - d_p) + d_r}{d_r d_p}$$

$$\text{Thus, } \frac{d_r d_p}{D} = -f_r(d_r - d_p) + d_r$$

$$\frac{d_r - d_r d_p}{D} = f_r(d_r - d_p)$$

$$\frac{\frac{d_r - d_r d_p}{D}}{d_r - d_p} = f_r$$

$$\text{or } f_r = \frac{1 - d_p/D}{1 - d_p/d_r}$$

The maximum value of $f_r$ is when $D = 0.5$ gcm$^{-3}$. In this case:

$$f_r = \frac{1 - d_p/0.5}{1 - d_p/d_r} \qquad \text{Equation 3}$$

with $d_p$ and $d_r$ measured in gcm$^{-3}$.

The apparent density $d_p$ is known or can be measured, as can the density $d_r$.

If $f_r$ is then calculated from Equation 2 the weight percentage of resin in the mixture of the starting resin solution (to be cured to give the resin in the product) and hollow particles used to form the granular mixture can be calculated or determined by simple experiment in a manner which will be familiar to those skilled in the art. In any event, the weight proportion of resin in the starting solution will never be greater than $f_r$ (expressed as a percentage).

As an example, the apparent density of glass microbubbles (one form of hollow particles) is typically 0.15 gcm$^{-3}$ and the density of a hardened Friedel-Crafts resin is typically 1.25 gcm$^{-3}$. The apparent density of the product is suitably 0.4 gcm$^{-3}$. In this example:

$$f_r = \frac{1 - 0.15/0.4}{1 - 0.15/1.25}$$

$$= \frac{1 - 0.4}{1 - 0.12} \text{ approximately}$$

$$= \frac{0.6}{0.88} \text{ approximately}$$

$$f_r = \tfrac{2}{3} \text{ approximately}$$

Thus, in this example the product contains resin and glass bubbles in a ratio of 2:1 by weight, approximately.

The upper limit of the percentage by weight of resin in the product is given by Equation 2 above. For the example quoted this will be given by $f_r = 0.8$ approximately.

Preferably, the weight percentage of resin in the product is not less than 45%, suitably not less than 50%.

Examples of suitable proportions in specific materials are given in the embodiments of the invention described below.

As noted above, material embodying the invention is convenient for packing into cavities in applications in which it is desired to cure resin by heat to form a solid rigid mass inside the cavity. The inside wall of the cavity may be lined with a curable resin, which may or may not be the same as that incorporated in the material according to the invention, to enable the material in the cavity to be bonded firmly to the cavity walls by the action of heat to form a sandwich structure. Alternatively, material according to the invention may be moulded (into any desired shape) in a mould by the action of heat and moderate pressure as conventionally used in the art with the moulding of thermosetting resins.

Material embodying the invention may be bonded to a skin material, preferably of high strength, eg a cloth containing carbon fibres, glass fibres, quartz fibres or Kevlar fibres or any hybrid of these. This may be done in a number of ways as follows:

i. The skin material is impregnated with a thermosetting resin (which may be the same as or different from that used to produce the material embodying the invention). The skin material is then wrapped around the material embodying the invention. The two are then heated to cure the resin or resins to form a bonded laminate sandwich structure.

ii. The material embodying the invention is sandwiched between sheets of the skin material impregnated with a thermosetting resin and the sandwich structure is heated to cure the resin or resins.

iii. The material embodying the invention is fully cured first and is then located between or wrapped by skin material impregnated with a cold-setting resin (eg an epoxy resin) which is allowed to set to bond the skin(s) and interior material together.

Sandwich structures formed in these ways may be made in shapes suitable for specific applications, eg aerofoil sections such as sections of aircraft wings or helicopter rotor blades, or as aircraft aerials or radomes.

The shapes may be obtained by curing in appropriately shaped moulds.

As noted above, hollow particles are known as fillers for resins. However, in contrast to the material according to the invention, such known filler particles are not only added to resin in proportions such that they do not affect the physical form, ie viscous liquid or paste form, of the resin before curing, but also the resin used with such particles is conventionally a cold setting resin and is usually allowed to cure immediately after the addition.

Materials containing glass particles with a binder, eg resin, added the proportion of glass particles present being high, are known, see U.S. Pat. No. 4,157,907 (published after the priority date of this application). However in such materials the glass particles are essentially not hollow so the product obtained is not a low density material in contrast to that obtained with the present invention. The glass used in fact in such known materials is a crystallisable glass which is unsuitable for forming hollow particles, eg glass bubbles.

Material according to the invention does not have to be cured immediately after it has been formed. In fact, some examples of the material may be stored without significant deterioration over long periods, eg several weeks, or longer, before use.

Examples of materials which have been made and which are embodiments of the present invention will now be described with reference to the accompanying drawings, in which:

FIG. 6 is a side view of an aerofoil structure;

FIG. 7 is a cross-sectional view on the line VII—VII of the structure shown in FIG. 6;

FIG. 8 is a cross-sectional view of material embodying the invention inside a mould; and FIG. 9 is a perspective view of a section of material obtained by moulding in the mould shown in FIG. 8.

EXAMPLE 1

50 grams of Xylok 237 (Trade Mark) resin, a Friedel-Crafts resin solution containing 60% w/w solids, was mixed with 50 grams of Xylok 237 hardener, an epoxy resin solution containing 90% w/w solids and 50 grams of methyl ethyl ketone (a mutual solvent). The above solution is referred to below as the 'stock solution'. 75 grams of the stock solution was added to 25 grams of 3M's Grade 15/250 (Trade Mark) glass bubbles which have a mean diameter and skin thickness of about 75 μm and about 2 μm respectively, the range of diameters being roughly 25 μm–130 μm.

A moist sandy mass was obtained which was readily broken up into grains and spread out on a tray or gauze mesh and allowed to air-dry so that the solvent could evaporate.

The material was pre-cured in an air oven for 30 minutes at 120° C., then cooled to room temperature (20° C.).

Figure 1:
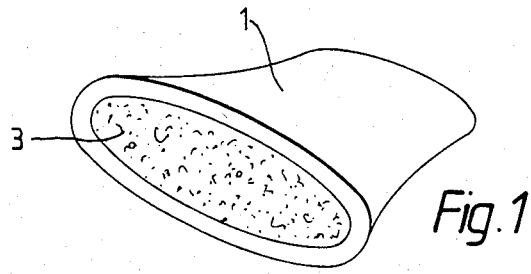
FIG. 1 is a perspective view of an aircraft aerial housing.

The resultant dry grains were packed into the hollow interior of an aircraft aerial housing so that the interior was completely filled with granules. This is illustrated in FIG. 1, where the housing, eg made of a glass fibre/- polyester resin laminate, is indicated by reference numeral 1, and the filling (ie the grains) is indicated by reference numeral 3.

The housing 1 and its filling 3 were then placed in an air oven (not shown) and heated at about 160° C. for about 1 hour to cure the filling 3. After cooling the cured filling 3 was removed from the housing 3. The grains had been converted into a strong, stiff foamed plastics core which in one piece reproduced the shape of the inside of the housing 1. In other words, the individual grains had been fused together, the glass bubbles being embedded within the resultant fused mass. The density of this mass (ie the cured filling 3) was 0.386 gm/cm$^3$.

The cured filling 3 was then permanently bonded into the housing 1. The interior walls of the housing 1 were brushed with the stock solution mentioned above. The cured filling 3 was then replaced inside the housing 1 and the two were then heated together in an air oven for about 30 minutes at about 160° C. to bond the filling 3 to the housing 1 by curing the resin on the interior walls of the housing 1.

EXAMPLE 2

A procedure similar to that in Example 1 was followed except that in this case the coating of the interior walls of the housing 1 with resin was carried out before packing the uncured grains into the housing 1. This allowed bonding of the filling 3 to the housing 1 to take place at the same time as curing of the filling 3.

EXAMPLE 3

The stock solution mentioned in Example 1 was diluted by adding 60 grams of methylene dichloride to 75 grams of the stock solution. 75 grams of the diluted solution and 25 grams of the glass bubbles used in Example 1 were mixed, pre-cured and then cured in an aerial housing as in Example 1.

However in this case the cured filling obtained from the grains had little mechanical strength and could be reconverted into grains by light pressure, eg finger pressure. In other words the material used for filling the aerial housing was not suitable for thermosetting into a fused solid mass, ie a stiff foamed plastics core, because it contained insufficient resin in its composition.

EXAMPLE 3

The stock solution and the glass bubbles used in Example 1 were mixed together in the ratio: 150 grams stock solution to 50 grams glass bubbles. The bubbles were stirred into the resin. The moist mass was spread onto a tray, dried and pre-cured at 120° C. for 60 minutes, being readily crumbled when still warm.

The product was then divided into three portions, by sieving ie grains smaller than 2 mm, grains between 2 and 3.35 mm in size, and grains larger than 3.35 mm, using sieves of 2 mm and 3.35 mm mesh.

All three portions were cured separately in the manner described in Example 1 and the resultant material in each case was a stiff foamed plastics mass containing glass bubbles embedded within it. This illustrates that the size of the grains is not critical.

EXAMPLE 4

Grains of the smallest sized portion in Example 3 were packed into a rectangular steel mould and cured at 160° C. overnight. The resulting rectangular bar extracted from the mould had a specific gravity of 0.367, in other words a density of 22.9 lb/ft$^3$.

EXAMPLE 5

Grains of the smallest sized portion in Example 3 were packed into a glass fibre mould of tapered aerofoil shape (not shown) and cured at 160° C. for several hours. The resultant material extracted from the mould was bonded by laminating resin to carbon fibre cloth (not shown) on its outer surface to form an aerofoil structure.

EXAMPLE 6

Figure 2:
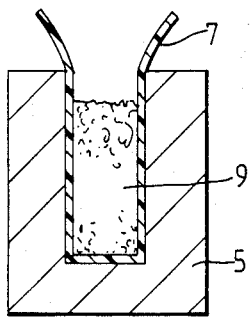
FIGS. 2, 3 and 4 are cross-sectional views of material embodying the invention inside a mould.

A steel mould having a rectangular bar-shaped cavity was lined along its length with a carbon fibre/glass fibre hybrid cloth impregnated with an uncured hot-setting (thermosetting) epoxy resin. The ends of the cloth overlapped the top of the mould. This is illustrated in FIG. 2 where the mould is indicated by reference numeral 5 and the cloth by reference numeral 7. The cavity was filled along most of its length with dry grains prepared as in Example 1 from the stock solution and glass bubbles. The grains are indicated in FIG. 2 by reference numeral 9.

Figure 3:
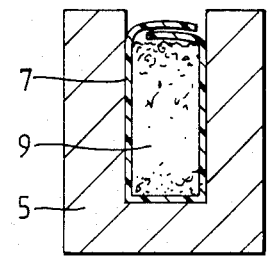

The ends of the cloth 7 were then folded over to lie on top of the grains 9, as shown in FIG. 3.

Figure 4:
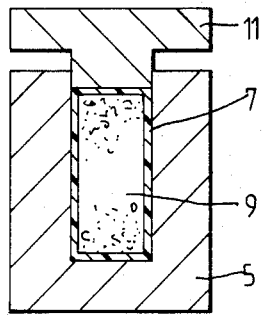
Figure 5:
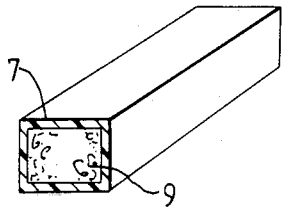
FIG. 5 is a perspective view of a bar of material obtained by moulding in the mould shown in FIGS. 2 to 4.

The mould 5 was then closed by a top 11 as shown in FIG. 4. The contents of the mould 5 (including both the Friedel-Crafts and epoxy resins) were allowed to cure together for 1 hour at 165° C. under light pressure from the top 11. The resulting material extracted from the mould 5 was as shown in FIG. 5, a rigid bar comprising a stiff foamed plastics core containing embedded glass bubbles, (ie the cured grains 9) bonded to the reinforcing skin provided by the cloth 7.

EXAMPLE 7

A two-part steel mould (not shown) having an upper portion and a lower portion together providing a cavity in the shape of an aerofoil (eg wing) section was lined on the mould surface of its lower portion with a sheet of unidirectional carbon fibre cloth, the carbon fibres running along the length of the section. The cloth had been pre-impregnated with the Friedel-Crafts resin stock solution used in Example 1. Grains produced from the stock solution and glass bubbles as described in Example 1 were then distributed over the cloth, the grains being pressed down gently with a hardboard sheet. The mould surface of the upper portion was lined with the same cloth as on the lower surface, the direction of the carbon fibres again being along the length of the section. The cloth had again been pre-impregnated with the stock solution used in Example 1. The two portions of the mould were closed together enclosing the grains in the cavity formed between them. The contents were cured for 1 hour at 165° C. The resulting structure removed from the mould was an aerofoil section comprising a stiff foamed plastics core containing embedded glass bubbles, bonded within unidirectional carbon fibre reinforcing skins.

A similar procedure was carried out with a second mould providing a cavity in the shape of an aerofoil section having a width equal to that of the cavity in the first mould but a depth less than that cavity. The resulting structure was an aerofoil section matching the first mentioned section but having a smaller depth.

The two sections were then bonded together by a cold setting resin to form a single aerofoil structure as shown in FIGS. 6 and 7. The section obtained from the first mould is shown as an upper section 13 whilst the section obtained from the second mould is shown as a lower section 15 bonded to it. The carbon fibre reinforcing skins of the upper section 13 and lower section 15 are indicated respectively by reference numerals 17 and 19 whilst the respective cores produced from the cured grains are indicated respectively by reference numerals 21 and 23.

EXAMPLE 8

Example 7 was repeated in a variety of alternative ways but by using glass-fibres, quartz fibres and Kevlar fibres and hybrids of these with and without carbon fibres as the reinforcing fibres and by using separately hot-setting phenolic, polyester and epoxy resins for pre-impregnating the various fibres.

EXAMPLE 9

In this Example a foamed plastics core obtained by curing the grains as in Example 7 was produced without the reinforcing carbon fibre skins. Skins were applied after curing as follows. The upper and lower surfaces of the cores were sanded to provide a clean roughened surface. Glass fibre tape was impregnated with a liquid catalysed epoxy resin, vis Bisphenol A epoxy—Ciba MY 750 (Trade Mark), 100 parts by weight, plus an aliphatic diamine hardener, 30 parts by weight.

The tape was applied unidirectionally to cover the top and bottom surfaces of the core. Its resin was allowed to cure, bonding the tape to the core by leaving the tape covered core overnight at room temperature (20° C.) followed by 3 hours at 70° C. in an air oven.

EXAMPLE 10

In this Example a two-part steel mould shown in FIG. 8 was used. This has portions 25 and 27 having an upper opening which may be closed by a top 29. The mould cavity is in the shape of an aerofoil section.

The mould was lined with carbon fibre cloth 31 pre-impregnated with a hot-setting resin solution, the ends of the cloth 31 overlapping the upper ends of the mould as in Example 6 above. The mould was filled along its length and partly filled as to depth with dry grains produced from the stock solution and glass bubbles as in Example 1. The ends of the cloth 31 were then folded inward as shown in FIG. 8. The mould was closed by the top 29 and the contents were cured for 1 hour at 165° C. to produce the aerofoil section shown in FIG. 9. This consisted of a stiff foamed plastics core containing embedded glass bubbles obtained from the cured grains 33, bonded to a carbon fibre reinforcing skin obtained from the cloth 31. The section provided the leading edge section of an aerofoil structure for a helicopter rotor blade. The aerofoil structure was completed by producing a complementary trailing edge section (not shown) in a similar way and bonding the two sections together.

EXAMPLE 11

50 grams of Xylok 237 (Trade Mark) resin was mixed with 50 grams of Xylok 237 hardener and 50 grams of methy ethyl ketone solvent. 50 grams of phenolic microballoons (phenolic spheres having a mean diameter of 60 $\mu$m) was added to the solution. The resultant mix was pre-cured in an air oven at 120° C. for 30 minutes and then allowed to cool to room temperature. This provided a reasonable yield of grains having a diameter between 2.0 mm and 3.35 mm which could be separated by sieves.

The grains were cured as in Example 1 for 1 hour at 160° C. The resulting material was a stiff foamed plastics core containing embedded phenolic microballoons and had a density of 0.339 gm/cm$^3$.

EXAMPLE 12

50 grams of Xylok 237 (Trade Mark) resin was mixed with 50 grams of Xylok 237 hardener and 50 grams of methyl ethyl ketone solvent. 170 grams of fly ash armospheres (impure silicate spheres obtained as a by-product from the burning of coal) having an average diameter of 75 $\mu$m were added to the solution. The resultant mix was pre-cured in an air oven at 120° C. for 30 minutes and then allowed to cool to room temperature. This provided a low yield of grains which could be separated from the main mass of the material by sieves and most of the grains had a diameter of 3.35 mm or greater.

Those grains which could be separated were cured for 1 hour at 160° C. to provide a stiff foamed plastics core material containing embedded armospheres. This material had a density of 0.589 gm/cm$^3$.

What is claimed is:

1. A material suitable for thermosetting including a collection of hollow particles having average diameters in the inclusive range of 20 $\mu$m to 150 $\mu$m, each particle coated with a curable thermosetting resin, said resin being presented in the material in an amount not less than 45% by weight such that the mixture exists in a granular form of discrete individual grains, each grain having an and average diameter of about 2 mm. or less and including one or more of said resin-coated hollow particles such that each grain remains separate from other grains, said mixture being convertible by thermosetting to a fused solid mass having a density not greater than 0.5 grams per cubic centimeter.

2. A material as claimed in claim 1 wherein the hollow particles are glass microbubbles.

3. A material as claimed in claim 1 wherein the hollow particles are fly ash armospheres.

4. A material as claimed in claim 1 and wherein the hollow particles are phenolic microballoons.

5. A material as claimed in claim 3 and wherein the resin is a hardenable Friedel-Crafts resin and the percentage by weight of resin contained in the material in such as to give, in a fused solid mass obtained by thermosetting the material, a percentage weight by resin of between the inclusive limits of 50 and 80%.

* * * * *